(12) United States Patent
Lee et al.

(10) Patent No.: US 6,231,829 B1
(45) Date of Patent: May 15, 2001

(54) CARBONACEOUS MATERIAL FOR ANODES OF RECHARGEABLE LITHIUM-ION BATTERY AND METHOD AND APPARATUS FOR SYNTHESIZING THE SAME

(75) Inventors: Jai Young Lee; Kuk Jin Jang; Young Soo Han; Hae Yeol Kim; Ji Sang Yu; Yun Sun Kang; Chan Do Park, all of Taejeon (KR)

(73) Assignee: Korea Advanced Institute of Science and Technology, Taejeon (KR)

( * ) Notice: Subject to any disclaimer, the term of this patent is extended or adjusted under 35 U.S.C. 154(b) by 0 days.

(21) Appl. No.: 09/393,241

(22) Filed: Sep. 9, 1999

(51) Int. Cl.[7] .................................................... C01B 31/02
(52) U.S. Cl. ..................................... 423/445 R; 423/447.3
(58) Field of Search ............................. 423/447.3, 445 R, 423/445 B

(56) References Cited

U.S. PATENT DOCUMENTS 5,500,200 * 3/1996 Mandeville et al. .............. 423/447.3
5,877,110 * 3/1999 Snyder et al. .................... 423/447.3

* cited by examiner

*Primary Examiner*—Stuart L. Hendrickson

(57) ABSTRACT

Disclosed is a carbonaceous material for anodes of lithium ion rechargeable batteries. The carbonaceous material consists of soot particles which are prepared from liquified propane gas through thermal decomposition. The soot particles are of disordered or amorphous carbon with very small crystallite sizes ($L_a$, $L_c \leq 30$ Å), containing a large quantity of unorganized carbon. When being used as an active material for an anode of a lithium ion secondary cell, the soot shows far greater reversible capacity than do conventional graphite carbonaceous materials.

5 Claims, 6 Drawing Sheets

CARBONACEOUS MATERIAL FOR ANODES OF RECHARGEABLE LITHIUM-ION BATTERY AND METHOD AND APPARATUS FOR SYNTHESIZING THE SAME

BACKGROUND OF THE INVENTION

1. Field of the Invention

The present invention relates to the development of an active material useful for an anode of lithium ion secondary cells.

2. Description of Prior Arts

Most commercially available rechargeable lithium ion batteries adopt highly ordered carbonaceous materials as active materials for their anodes. Generally, highly ordered carbonaceous materials are those which have a crystal lattice $Lc(002) \geq 50$ Å with a distance between carbon layer planes $d_{002} \leq 3.4$ Å. Showing a Coulomb effect with a low flat potential curve upon discharging in addition to being low in moisture content and relative impurity content, they are known to be easily applicable in practical processes. Where cost is an important determinant in commercializing the highly ordered carbonaceous materials, they are very disadvantageous in that they are decomposed by reaction to electrolytes and need a high temperature treatment and a high purification treatment. What is worse, they have a theoretical discharge capacity as low as 372 $mAhg^{-1}$. Therefore, there remains a need to develop novel carbonaceous materials which have a larger discharge capacity for high capacity rechargeable batteries.

Recently, there have been reported many research results on carbonaceous materials of low crystallinity which have a higher capacity than the theoretical charge and discharge capacity of the highly ordered carbonaceous materials. Particularly, hard carbons, although suffering from a low initial Coulomb effect and a difficult charging process, attract scientific attention by virtue of their higher electric capacity (400~650 $mAhg^{-1}$) than the theoretical value of graphite, low reactivity with electrolytes, and low production cost according to relatively low temperature treatment.

Yoshino et al., prepared a carbonaceous material for lithium ion secondary cells by the pyrolysis of benzene gas. Dahan et al., reported that a disordered carbonaceous material with a high capacity could be prepared by doping boron (B) through a chemical vapor deposition (CVD) process. As for carbonaceous materials prepared by vapor deposition, thus far, most of them are of pyrolyzed carbons deposited on substrates. In fact, because only a very small quantity of carbonaceous materials are deposited through thermal CVD, they are very disadvantageous in productivity and production cost when using them as active materials for the anodes of lithium ion batteries.

There are reports regarding the preparation of carbonaceous materials for anodes of lithium ion rechargeable batteries from solid phase carbon-containing precursors through thermal treatment. For example, polyparaphenylene (Sato et al.), coal-tar pitch (Mabuchi et al.), a phenolic resin (Yara), and sugar carbon (Xing and Xue) are subjected to thermal treatment to produce disordered carbonaceous materials of high charge and discharge capacity. Also, it is reported that various solid phase precursors, such as petroleum pitch, polyvinyl chloride (PVC), polyvinylidene fluoride (PVDF), polyphenylene sulfide (PPS), and epoxy novolac resin (ENR), can be thermally treated to produce disordered carbonaceous materials which show largely two charging and discharging properties depending on the precursors. Particularly, when the carbonaceous materials prepared are of hard carbon, they are reported to be more suitable as active materials for anodes of lithium ion rechargeable batteries. However, since the solid thermal treatment process for the preparation of carbonaceous materials has fewer controllable parameters than have vapor deposition processes, it suffers from disadvantages in that it is inconvenient to conduct the structure control of carbonaceous materials, and it is very difficult to add other elements and to control their amounts.

SUMMARY OF THE INVENTION

Therefore, it is an object of the present invention to overcome the problems encountered in prior arts and to provide a carbonaceous material for the anode of lithium ion rechargeable batteries, which is superior to highly ordered carbonaceous materials in charge and discharge capacity and properties.

It is another object of the present invention to provide a method for preparing such a carbonaceous material.

It is a further object of the present invention to provide an apparatus in which the preparation of such a carbonaceous material can be achieved.

In accordance with an aspect of the present invention, there is provided a carbonaceous material for anodes of lithium ion rechargeable batteries, which is the soot produced from liquified propane gas through thermal decomposition by a vapor deposition process.

In accordance with another aspect of the present invention, there is provided a method for preparing a carbonaceous material for anodes of lithium ion rechargeable batteries, comprising the steps of: heating a reaction tube to a temperature of 800~1,300° C. with argon gas flowing in the reaction tube; introducing 10~100% propane gas provided to the reaction apparatus as liquefied propane, into the reaction tube, in which the propane gas is thermally decomposed for 1 to 5 hours while the temperature is maintained; and cooling the reaction tube by introducing argon gas into the reaction tube.

In accordance with a further aspect of the present invention, there is provided an apparatus for preparing a carbonaceous material for anodes of lithium ion rechargeable batteries, comprising a reaction tube flanked by flanges, in which propane gas is thermally decomposed into carbon atoms or molecules and hydrogen atoms and molecules and the carbon atoms are subjected to homogeneous nucleation to produce soot; a furnace for heating the reaction tube; a thermostat for controlling the temperature of the reaction tube through a heat wire; a soot getter for collecting the soot; two drying chambers in which liquified propane gas and argon gas are dried, respectively, before being introduced into the apparatus; two flow meters for respectively controlling the flow and composition of the propane gas and the argon gas which come from the drying chambers; an inlet valve through which the propane gas and the argon gas are mixed; and a pressure gauge for monitoring the pressures of the propane gas and argon gas just before being introduced into the reaction tube.

Based on the fact that a large quantity of soot is generated when hydrocarbons are thermally cracked, the present invention is designed as a soot getter in which the soot can be recovered at a maximal efficiency. While passing through a reaction zone in the center of a furnace, hydrocarbon gases are thermally decomposed into carbon atoms (or molecules) and hydrogen atoms (or molecules). Meanwhile, the carbon atoms (or molecules) of a gas phase react with each other to cause homogeneous nucleation, aggregating to droplets. As they go from the reaction zone to an exhaust outlet, they get gradually larger and finally, are accumulated in particle forms. If the soot particles are not grown sufficiently until they reach the exhaust outlet, they are drained out through the outlet. In the present invention, a soot getter is mounted to an end portion of the reaction tube, that is, to the exhaust outlet, in order to recover the soot particles.

Soot, which is usually produced at a large amount upon the thermal decomposition of hydrocarbons, is of disordered carbon as well as of isotropic carbon and hard carbon. With these properties, soot can be used as an active material for the anode of lithium ion rechargeable batteries, which shows superb electrode properties and far greater specific capacity than do graphite materials usually used.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
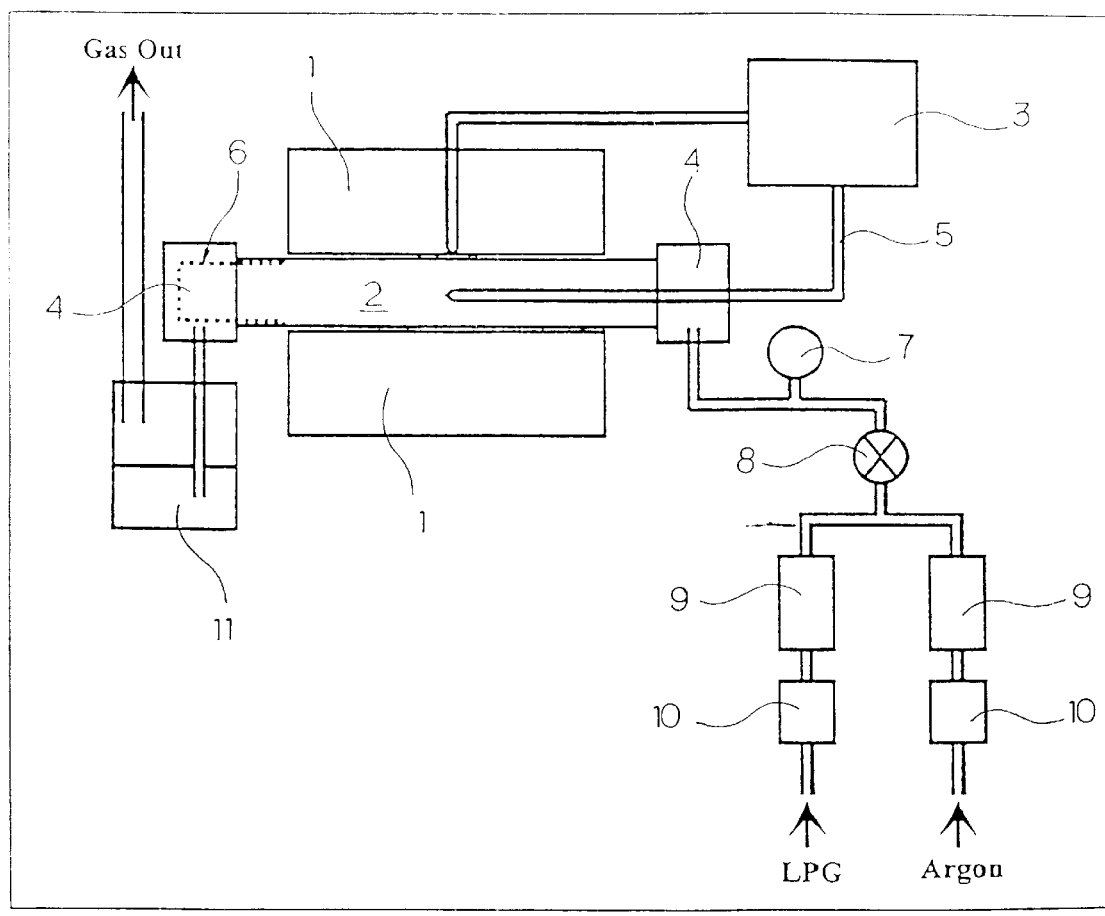
FIG. 1 is a schematic view showing a thermal decomposition apparatus in which a carbonaceous material useful as an active material for an anode of a lithium ion secondary cell is prepared, according to the present invention.

Because of ease in controlling the structure and composition of carbonaceous materials, the present invention utilizes vapor deposition rather than solid phase thermal treatment. The biggest problem that conventional vapor deposition methods face is that carbonaceous materials are deposited at a very little amount with a poor deposition rate on substrates. In the most cases reported thus far, the carbonaceous materials of interest are those which are deposited on substrates.

In the present invention, quality soot is produced by the thermal decomposition of liquified propane gas. In this regard, to understand the production mechanism of soot is helpful in approaching the present invention. As going through a reaction zone in a central portion of a furnace, hydrocarbon gases are pyrolyzed into carbon atoms (or molecules) and hydrogen atoms (or molecules). At this time, the carbon atoms or molecules in a gas phase react with each other, producing homogeneous nucleation. Accordingly, they aggregate into droplets which, then, become larger as they approach an exhaust outlet. Finally, they are accumulated with particle forms in an end portion of the reaction tube, i.e., in the exhaust outlet. If the soot particles are not grown sufficiently until they reach the exhaust outlet, they are not accumulated, but drained out through the outlet. In the present invention, a soot getter comprising a nickel mesh is established to maximize the recovery rate of soot.

A better understanding of the present invention may be obtained in light of the following examples which are set forth to illustrate, but are not to be construed to limit the present invention.

EXAMPLE I

Before assembling a reaction tube, a soot getter was mounted to the exhaust outlet of the reaction tube. Liquified propane gas, used as a reaction gas in the present invention, and argon gas, serving as a carrier, were demoisturized while passing through a drying chamber, and their compositions and flow rates were controlled by a tri-flat variable area flow meter before they entered the reaction tube. While the two gases reached a reaction zone of the reaction tube, they were completely mixed. The reaction tube, made of an alumina tube, was heated with the aid of a horizontal type tube furnace using SiC as a heating element. The reaction temperature was controlled and measured by use of a thermostat connected to an R-type thermocouple, as follows.

First, the temperature of the reaction tube was slowly elevated while flowing the demoisturized argon gas at a flow rate of 1.0˜1.4 l/min into the reaction tube. When the temperature of the reaction tube reached 800˜1,300° C. by use of a horizontal type hot wall furnace, propane gas with a propane content of 10˜100% was allowed to flow for reaction. At 1˜5 hours after the reaction, the feeding of the propane gas was ceased. After the reaction temperature was maintained for a period of time enough to sufficiently remove the propane gas remaining in the reaction tube, the feeding of the argon gas was started to lower the temperature of the reaction tube. When the reaction tube was cooled to room temperature, the reaction tube was disassembled to allow a lot of soot particles which had been deposited on the soot getter and the wall of the reaction tube to be scraped up. They were used to prepare an anode of a lithium ion rechargeable battery which was then tested for charge and discharge properties.

With reference to FIG. 1, there is a schematic view illustrating a thermal decomposition apparatus for preparing the carbonaceous material of the present invention. As used herein, liquefied propane gas (LPG) signifies propane gas initially supplied to the reaction apparatus in liquefied form. LPG is first dried in a drying chamber 10, controlled in its composition and flow rate by a tri-flat variable area flow meter 9 and flowed into a reaction tube 2 via an inlet valve 8 under the monitoring of a pressure gauge 7. The reaction tube is heated by a horizontal type hot-wall surface 1 under the control of a thermostat 3 which senses the temperature of the reaction tube via a heat wire 5. When the reaction tube 2 is heated to a desirable temperature, the LPG is decomposed to carbon atoms (or molecules) and hydrogen atoms (molecules). At this time, the carbon atoms or molecules of a gas phase are reacted with each other, causing homogeneous nucleation owing to which the carbon molecules get forms of droplets. They become larger as they approach an exhaust outlet. Ultimately, they are accumulated with particle forms in the end of the exhaust outlet. The soot particles which have not been grown sufficiently until they reach the exhaust outlet, are not accumulated, but drained out. Therefore, a soot getter 6 established in the end of the exhaust outlet can bring about a great improvement in the recovery rate of the soot.

Figure 2A:
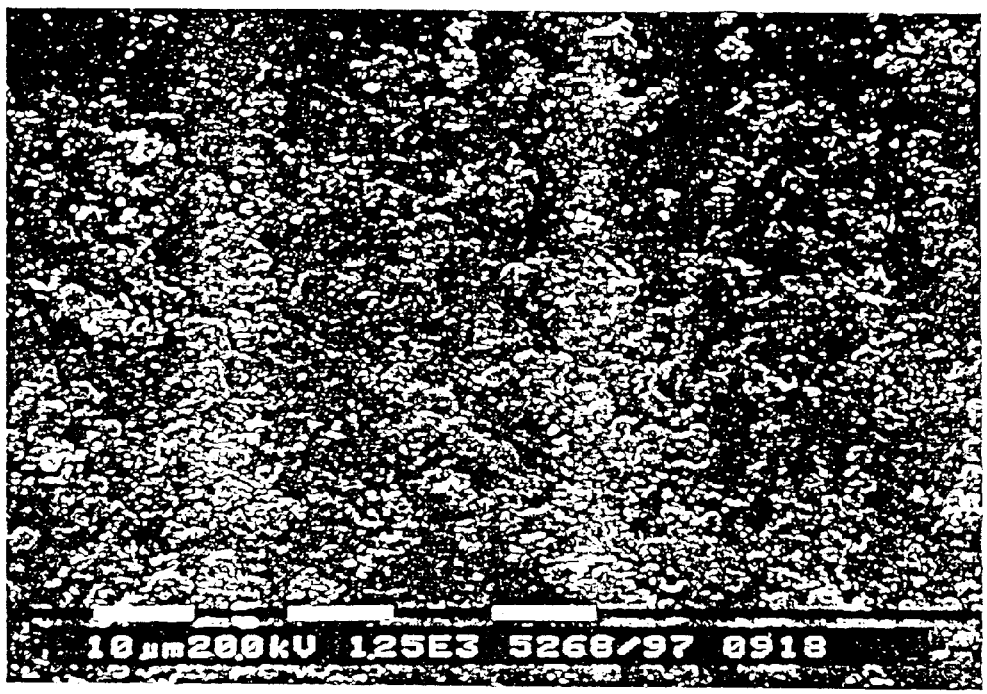
FIG. 2 shows scanning electron micrographs of the soot prepared in the apparatus of FIG. 1.
Figure 2B:

With reference to FIG. 2, there are scanning electron micrographs showing the soot produced by the thermal decomposition apparatus of the present invention. From the photograph of FIG. 2a, magnified at 1,250 times, it is recognized that the soot consist of particles with a size of about 0.5˜5.0 μm. FIG. 2b shows one of the soot particles at a magnification of 40,000 times, demonstrating that the particles are porous and formed as a result of the gradual growth of globular droplets in a gas phase.

Figure 3:
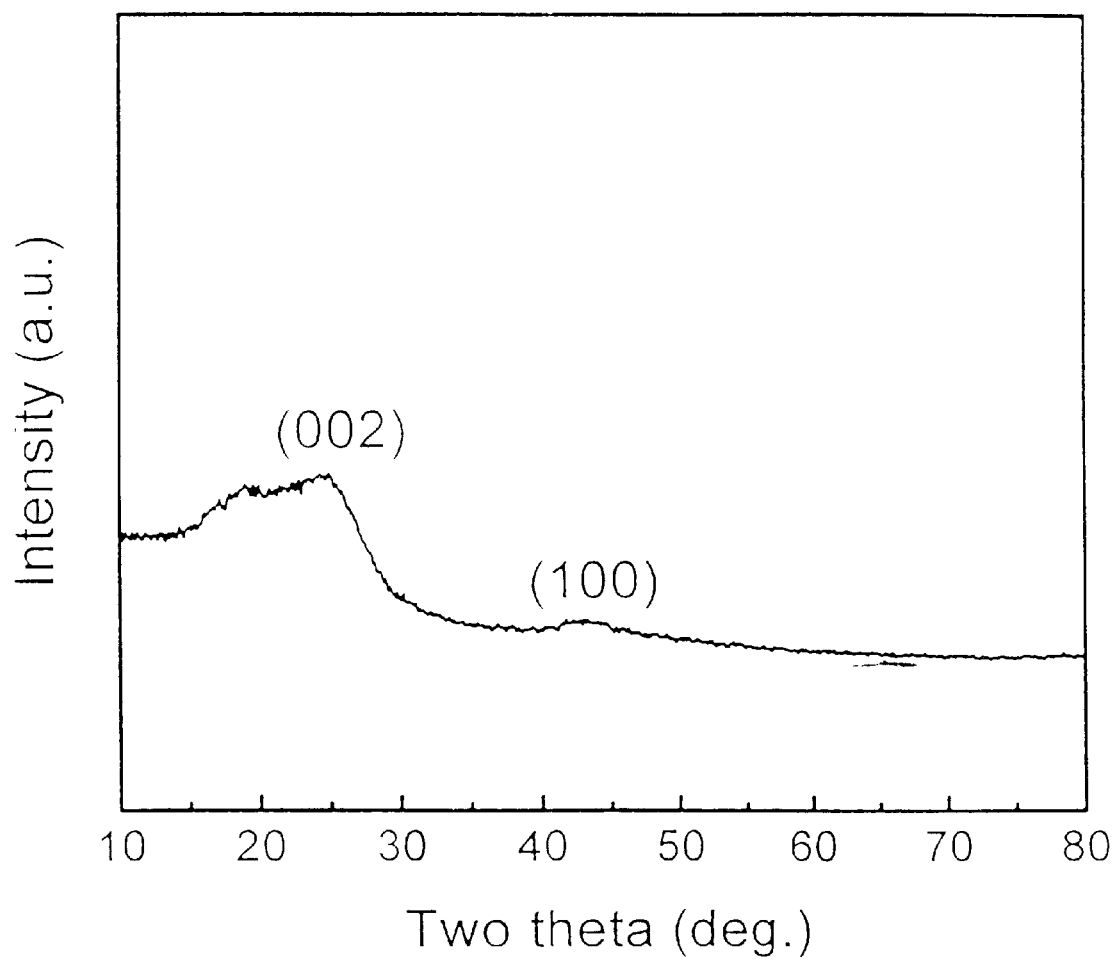
FIG. 3 is an X-ray diffraction pattern of the soot prepared in the apparatus of FIG. 1.

With reference to FIG. 3, there is an X ray diffraction curve. From the broad (002) Bragg peak, it is apparent that the soot is a kind of disordered carbon. The distance between (002) planes is determined to be 3.476 Å. Using the Scherrer formula, the Lc is calculated to be about 21Å.

Figure 4:
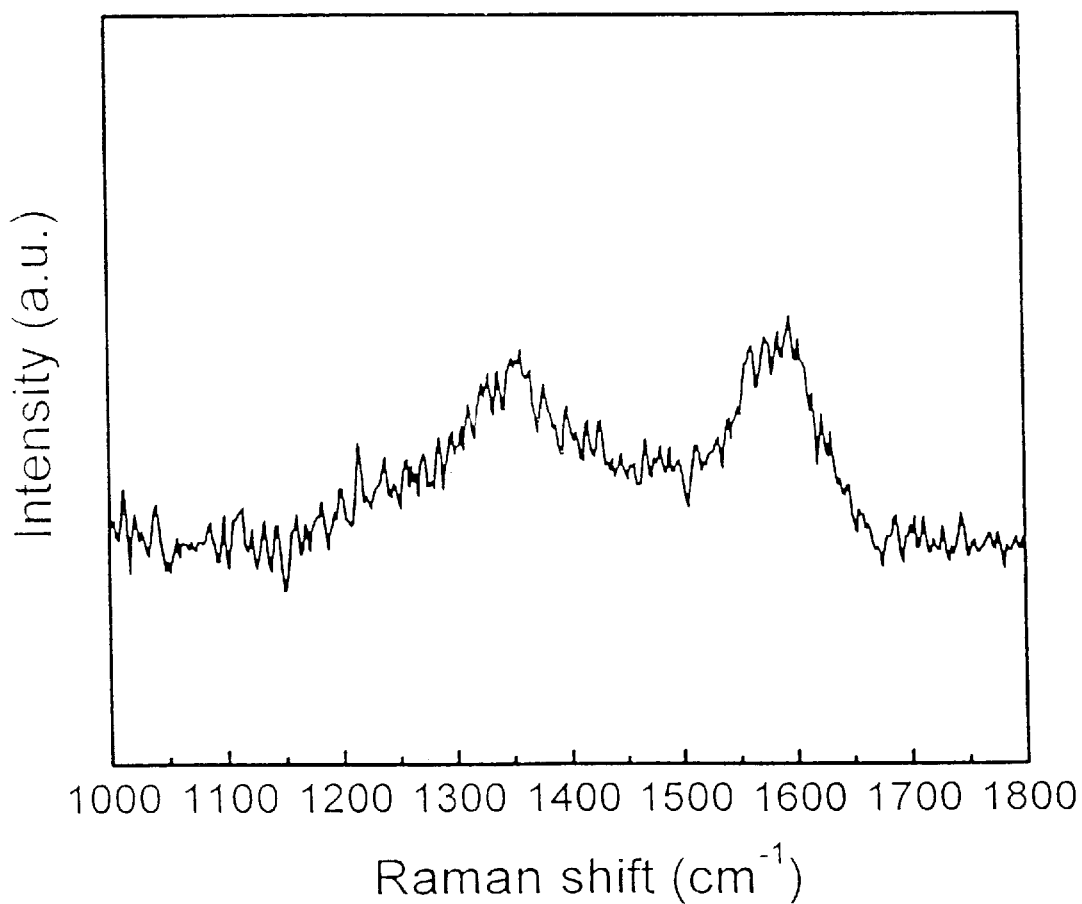
FIG. 4 is a Raman spectrum of the soot prepared in the apparatus of FIG. 1.

Turning to FIG. 4, there is a Raman spectrum of the soot produced by the thermal decomposition apparatus of the present invention. There are read two broad peaks near 1360 $cm^{-1}$ and 1580 $cm^{-1}$, respectively. Particularly, the soot shows a large intensity ratio of the peak at 1360 $cm^{-1}$ to the peak at 1580 $cm^{-1}$ as compared with highly ordered carbonaceous material, which indicates that the soot prepared according to the present invention is of disordered carbonaceous material with a small graphene crystallite size and contains disorganized carbon in abundance. In addition, the $L_a$ value is found to be very small.

Figure 5A:
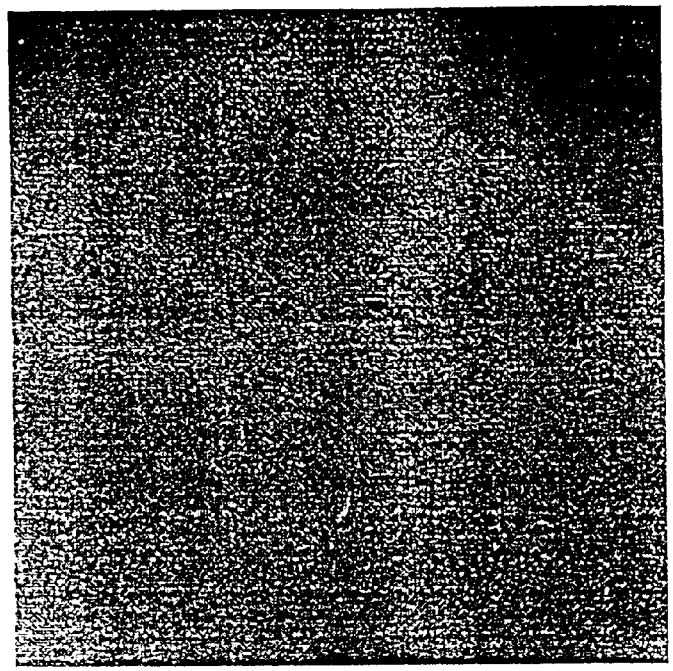
FIG. 5 shows transmission electron micrographs of the soot prepared in the apparatus of FIG. 1.
Figure 5B:
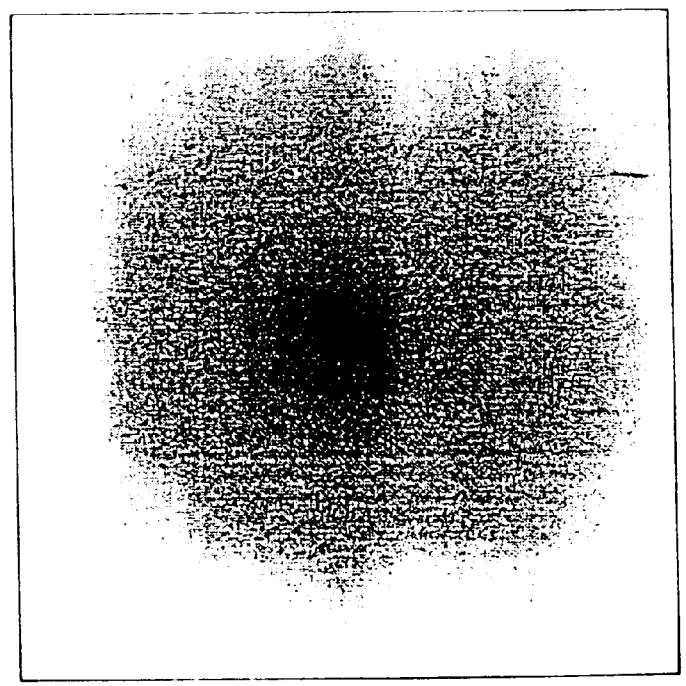

With reference to FIG. 5, there are transmission electron micrographs (TEM) of the soot prepared by the thermal decomposition apparatus according to the present invention. As seen from the TEM image of FIG. 5a, magnified by two hundred thousand times, no grain boundaries are observed. The selected area diffraction pattern (SADP) of a soot particle, as shown in FIG. 5b, is of a halo ring. Therefore, these TEM images demonstrate that the soot prepared according to the present invention is an almost complete, amorphous carbon.

EXAMPLE II

A working electrode was prepared by using the soot obtained in Example I as an active material and polyvinylidene fluoride (PVDF) as a binder. This working electrode was used to make a tri-electrode test cell in which a lithium metal foil and a lithium metal chip were recruited as a counter electrode and a reference electrode, respectively. For an electrolyte, 1M $LiPF_6$ was dissolved in a mixed solution of 1:1 ethylene carbonate:diethyl carbonate. These cell assembling operations all were conducted in a glove box which maintained water and oxygen at a concentration of 1 ppm or less. The cell was subjected to charging and discharging at a constant rate of 7.44 mA/g.

Figure 6:
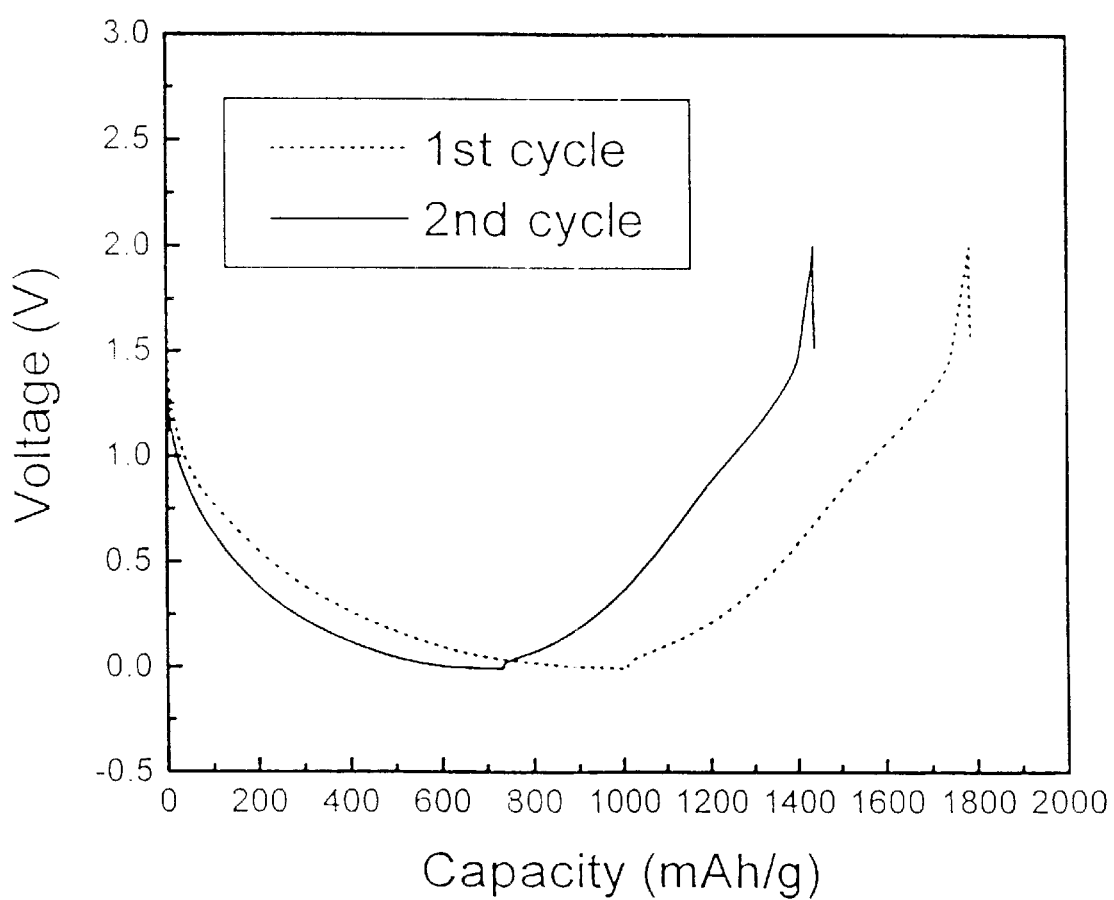
FIG. 6 is a charge/discharge curve of an electrode which uses the soot as an active material.

With reference to FIG. 6, there is a charge/discharge curve of the cell. From the charge/discharge curve obtained after a first cycle, it is recognized that the electrode made of the soot has an irreversible capacity of about 280 mAh/g. The curve after a second cycle makes the reversible capacity of the cell recognized to be 700 mAh/g which is about twice greater than the theoretical reversible capacity of a highly ordered graphite carbonaceous material, 372 mAh/g.

As described hereinbefore, soot, which can be prepared according to the present invention, can be used as an active material for the anode of lithium ion rechargeable batteries because it is an amorphous carbonaceous material which exhibits much greater reversible capacity than do commercially available highly ordered carbonaceous materials. Thus, high capacitance, high performance lithium ion rechargeable batteries can be achieved by employing the soot of the present invention. It is expected that the lithium ion batteries using this anode active material increase their market share in the secondary cell market and achieve a high performance of electric vehicles.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A method for preparing a carbonaceous material for anodes of lithium ion rechargeable batteries, the method comprising:

heating a reaction tube to a temperature of 800–1300° C. with argon gas flowing in the reaction tube;

flowing a gas comprising propane into the reaction tube for from 1 to 5 hours while the temperature is maintained, wherein the propane gas is thermally decomposed; and cooling the reaction tube by introducing argon gas into the reaction tube, thereby preparing the carbonaceous material in an amorphous state.

2. A method as set forth in claim 1 wherein the gas comprising propane is between about 10 percent and about 100 percent propane.

3. A method as set forth in claim 1, wherein the reaction tube is provided at the end of its outlet end with a soot getter made of nickel.

4. A method as set forth in claim 3 wherein the amorphous carbonaceous material comprises soot, the soot comprising particles with a size between about 0.5 and 5 microns.

5. A method as set forth in claim 3 further comprising disassembling the reaction tube and collecting soot particles deposited on walls of the reaction tube and on the soot getter.

\* \* \* \* \*